(12) United States Patent
Paulraj et al.

(10) Patent No.: US 11,625,379 B2
(45) Date of Patent: Apr. 11, 2023

(54) DATA HARMONIZATION ACROSS MULTIPLE SOURCES

(71) Applicant: AT&T Intellectual Property I, L.P., Atlanta, GA (US)

(72) Inventors: Prince Paulraj, Coppell, TX (US); Shilpi Harpavat, Plano, TX (US); Weiping Liu, Plano, TX (US); Shreyash Taywade, Dallas, TX (US); Arjun Coimbatore Nagarasan, Lewisville, TX (US); Yukun Zeng, Plano, TX (US); Prabhu Gururaj, McKinney, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 333 days.

(21) Appl. No.: 16/782,754

(22) Filed: Feb. 5, 2020

(65) Prior Publication Data
US 2021/0173822 A1 Jun. 10, 2021

Related U.S. Application Data

(60) Provisional application No. 62/944,857, filed on Dec. 6, 2019.

(51) Int. Cl.
*G06F 7/00* (2006.01)
*G06F 16/22* (2019.01)
(Continued)

(52) U.S. Cl.
CPC ........... *G06F 16/2272* (2019.01); *G06N 5/04* (2013.01); *G06N 20/00* (2019.01); *G06Q 30/016* (2013.01);
(Continued)

(58) Field of Classification Search
CPC .... G06F 16/24578; G06F 16/24; G06F 16/13; G06F 16/2272; G06N 20/00; G06N 5/04;
(Continued)

(56) References Cited

U.S. PATENT DOCUMENTS

2009/0063537 A1* 3/2009 Bonnefoy-Cudraz ...................... G06F 16/337 707/999.102
2015/0207901 A1* 7/2015 Dunn ..................... G06Q 10/00 709/204

(Continued)

*Primary Examiner* — Mohammad A Sana

(57) ABSTRACT

In another example, a device includes a processor and a computer-readable medium storing instructions which, when executed by the processor, cause the processor to perform operations. The operations include acquiring a plurality of data items from a plurality of data sources, wherein the at least two data sources data sources of the plurality of data sources are maintained by different entities, normalizing attributes of the plurality of data items, using a first machine learning technique, matching at least two data items of the plurality of data items to form a grouping, wherein the matching is based on similarities observed in the attributes of the at least two data items subsequent to the normalizing, and creating a single profile for an individual associated with the at least two data items, based on the grouping, wherein the single profile consolidates the attributes of the at least two data items.

20 Claims, 5 Drawing Sheets

(51) Int. Cl.
*G06N 20/00* (2019.01)
*G06Q 40/02* (2023.01)
*G06Q 30/0201* (2023.01)
*G06Q 30/016* (2023.01)
*G06N 5/04* (2023.01)

(52) U.S. Cl.
CPC ......... *G06Q 30/0201* (2013.01); *G06Q 40/02* (2013.01)

(58) Field of Classification Search
CPC ... G06Q 30/016; G06Q 30/0201; G06Q 40/02
See application file for complete search history.

(56) References Cited

U.S. PATENT DOCUMENTS

| | | | |
|---|---|---|---|
| 2015/0378975 A1* | 12/2015 | Wu | G06Q 10/10 715/226 |
| 2016/0147758 A1* | 5/2016 | Chhaya | G06F 16/437 707/733 |
| 2017/0308939 A1* | 10/2017 | Krishnan | G06Q 30/0603 |
| 2018/0268373 A1* | 9/2018 | Bheemavarapu | G06Q 10/1053 |
| 2020/0125802 A1* | 4/2020 | Wigder | G06F 40/30 |
| 2021/0049207 A1* | 2/2021 | Cao | H04L 63/0236 |

* cited by examiner

300

CELLULAR SERVICE PROVIDER A

NAME: ROBERT SMITH  MOBILE: (123) 456-7890
BIRTHDAY: JANUARY 5, 1980  PLAN: XYZ
ADDRESS: ATLANTA, GA  CUSTOMER SINCE: DECEMBER 2000
EMAIL: rsmith@email.com

— $302_1$

IS THIS YOU?  ☐YES ☐NO ☐EDIT — $304_1$

INTERNET SERVICE PROVIDER B

NAME: ROBERT P. SMITH  MOBILE: (123) 456-7890
BIRTHDAY: JANUARY 5, 1980  PLAN: ABC
ADDRESS: ATLANTA, GA  CUSTOMER SINCE: JUNE 2009
EMAIL: rsmith@email.com

— $302_2$

IS THIS YOU?  ☐YES ☐NO ☐EDIT — $304_2$

SOCIAL MEDIA PLATFORM C

NAME: BOB S.
BIRTHDAY: 1980  GROUPS: ATLANTA FALCONS, GA TECH ALUMNI
LOCATION: FULTON COUNTY
EMAIL: rsmith@email.com  LAST SIGN IN: 2 DAYS AGO — $302_q$ IS THIS YOU?  ☐YES ☐NO ☐EDIT — $304_q$

LEGAL NAME: ROBERT SMITH

ALIASES: ROBERT P. SMITH, BOB SMITH, BOB S.

ADDRESS: ATLANTA, GA

BIRTHDAY: JANUARY 5, 1980

EMAIL: rsmith@email.com

SCHOOLS ATTENDED: GEORGIA TECH (1998-2002)

SERVICE PROVIDER SUBSCRIPTIONS:
- CELLULAR SERVICE PROVIDER A – PLAN XYZ
  - USAGE: 98% OF VOICE CALLING
    120% OF DATA
- INTERNET SERVICE PROVIDER B – PLAN ABC
- STREAMING MEDIA SERVICE PROVIDER C – PLAN DEF

RECOMMENDATION HISTORY:
- JANUARY 15, 2020 – SWITCH TO CELLULAR SERVICE PROVIDER PLAN RST
- FEBRUARY 12, 2020 – DISCOUNT ON SUBSCRIPTION TO STREAMING MEDIA SERVICE PROVIDER C FOR GA TECH ALUMNI

FIG. 4

DATA HARMONIZATION ACROSS MULTIPLE SOURCES

CROSS REFERENCE TO RELATED APPLICATIONS

This application claims the priority of U.S. Provisional Patent Application Ser. No. 62/944,857, filed Dec. 6, 2019, which is herein incorporated by reference in its entirety.

BACKGROUND

The present disclosure relates generally to data systems, and relates more particularly to artificially intelligent devices, non-transitory computer-readable media, and methods for harmonizing data across multiple sources.

Many service providers, including telecommunications service providers, financial service providers, media service providers, ecommerce service providers, and the like, maintain databases of consumer data. These databases may include, for example, the names of the consumers to whom the service providers provide services, contact information (e.g., phone number, email address, physical address etc.) for the consumers, birthdates of the consumers, the types and/or levels of services (e.g., tier of Internet speed for Internet service providers, data quota for cellular service providers, number of concurrently connected devices for media service providers, and the like) to which the consumers are subscribed, and other data.

BRIEF DESCRIPTION OF THE DRAWINGS

The teachings of the present disclosure can be readily understood by considering the following detailed description in conjunction with the accompanying drawings, in which:

FIG. 3 illustrates an example grouping of data items that may be presented to an individual for verification in accordance with the method of FIG. 2;

FIG. 4 illustrates an example profile that may be created based on the grouping of FIG. 3.

To facilitate understanding, identical reference numerals have been used, where possible, to designate identical elements that are common to the figures.

DETAILED DESCRIPTION

Figure 1:
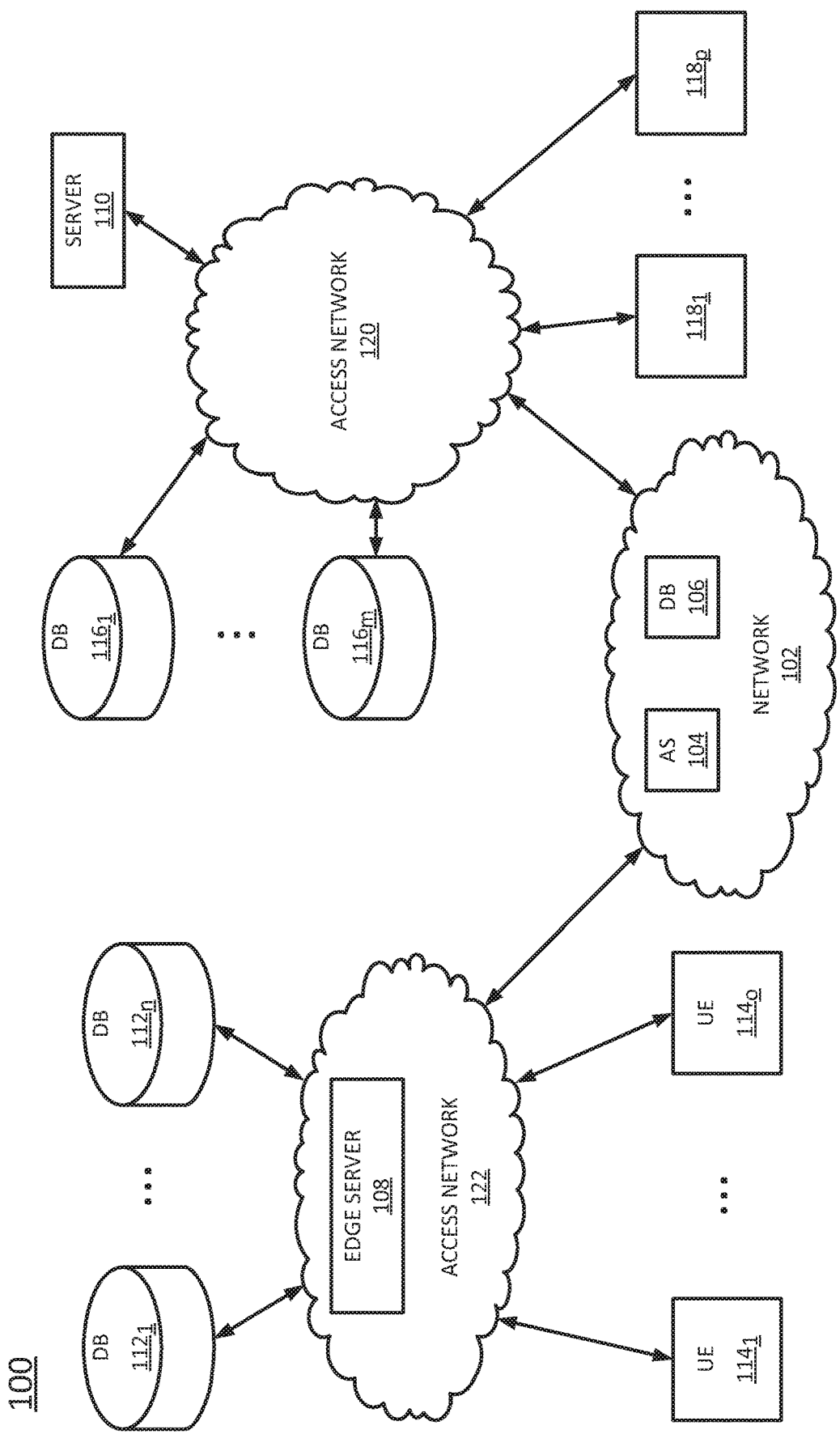
FIG. 1 illustrates an example system in which examples of the present disclosure may operate.

In one example, the present disclosure describes a device, computer-readable medium, and method for harmonizing data across multiple sources. For instance, in one example, a method performed by a processing system including at least one processor includes acquiring a plurality of data items from a plurality of data sources, wherein the at least two data sources data sources of the plurality of data sources are maintained by different entities, normalizing attributes of the plurality of data items, using at least one machine learning technique, matching at least two data items of the plurality of data items to form a grouping, wherein the matching is based on similarities observed in the attributes of the at least two data items subsequent to the normalizing, and creating a single profile for an individual associated with the at least two data items, based on the grouping, wherein the single profile consolidates the attributes of the at least two data items.

In another example, a device includes a processor and a computer-readable medium storing instructions which, when executed by the processor, cause the processor to perform operations. The operations include acquiring a plurality of data items from a plurality of data sources, wherein the at least two data sources data sources of the plurality of data sources are maintained by different entities, normalizing attributes of the plurality of data items, using a first machine learning technique, matching at least two data items of the plurality of data items to form a grouping, wherein the matching is based on similarities observed in the attributes of the at least two data items subsequent to the normalizing, and creating a single profile for an individual associated with the at least two data items, based on the grouping, wherein the single profile consolidates the attributes of the at least two data items.

In another example, a non-transitory computer-readable medium stores instructions which, when executed by a processing system including at least one processor, cause the processing system to perform operations. The operations include acquiring a plurality of data items from a plurality of data sources, wherein the at least two data sources data sources of the plurality of data sources are maintained by different entities, normalizing attributes of the plurality of data items, using at least one machine learning technique, matching at least two data items of the plurality of data items to form a grouping, wherein the matching is based on similarities observed in the attributes of the at least two data items subsequent to the normalizing, and creating a single profile for an individual associated with the at least two data items, based on the grouping, wherein the single profile consolidates the attributes of the at least two data items.

As discussed above, many service providers maintain databases of consumer data. These databases may include, for example, the names of the consumers to whom the service providers provide services, contact information (e.g., phone number, email address, physical address etc.) for the consumers, birthdates of the consumers, the types and/or levels of services (e.g., tier of Internet speed for Internet service providers, data quota for cellular service providers, number of concurrently connected devices for media service providers, and the like) to which the consumers are subscribed, and other data. A consumer who is subscribed to multiple services may therefore have his data stored in multiple different databases.

However, these multiple different databases may not store the data in the same format. For instance, a consumer may have his name listed as "Robert Smith" in the database of his Internet service provider, while a financial service provider's database may list his name as "Robert P. Smith," and a streaming media service provider's database may list his name as "Bob Smith." Similarly, one database may list his birthdate as "January 5, 1980," while another database may list his birthdate as "1/5/80" and still another database may list his birthdate as "05/01/1980." As such, it may be difficult to determine that "Robert Smith," "Robert P. Smith," and "Bob Smith" are all the same person. Although rules and models may be developed to reconcile these differences in formats, such rules and models tend to be computationally complex and time consuming.

Examples of the present disclosure enable harmonization of data across multiple data sources. For instance, in one example, data from multiple different sources (e.g., maintained by multiple different entities, and potentially in multiple different formats) may be normalized in a manner that allows for the data to be grouped according to similarity. This may allow, for instance, the data for a single consumer who subscribes to the services of multiple service providers to be consolidated in one place. Consolidation of the consumer's data may, in turn, allow for recommendations to be made to the consumer that, on the consumer side, may improve the consumer's experience with one or more of the service providers. On the service provider side, the consolidation and ability to make recommendations may simplify operational and cost optimizations.

Although examples of the present disclosure are described within the context of consumer data, the present disclosure is not limited to use in this context. For instance, a business or other enterprise may benefit from consolidation of data as well, as consolidation may allow a business to better manage which and/or how many vendors the business uses to meet various needs of the business (e.g., where to purchase routers and other information technology (IT) equipment, where to purchase employee health care insurance, etc.). The examples disclosed herein are domain-agnostic, meaning the examples may apply to the harmonization of any type of data, for any type of industry or application. In some instances, the examples disclosed herein may even be used to harmonize data across multiple different domains.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, or an enterprise network comprising infrastructure for computing and communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet or data services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over internet Protocol (VoIP) telephony services. Network 102 may further comprise a broadcast television network, e.g., a traditional cable provider network or an internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth.

In one example, the access networks 120 and 122 may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, $3^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

Figure 5:
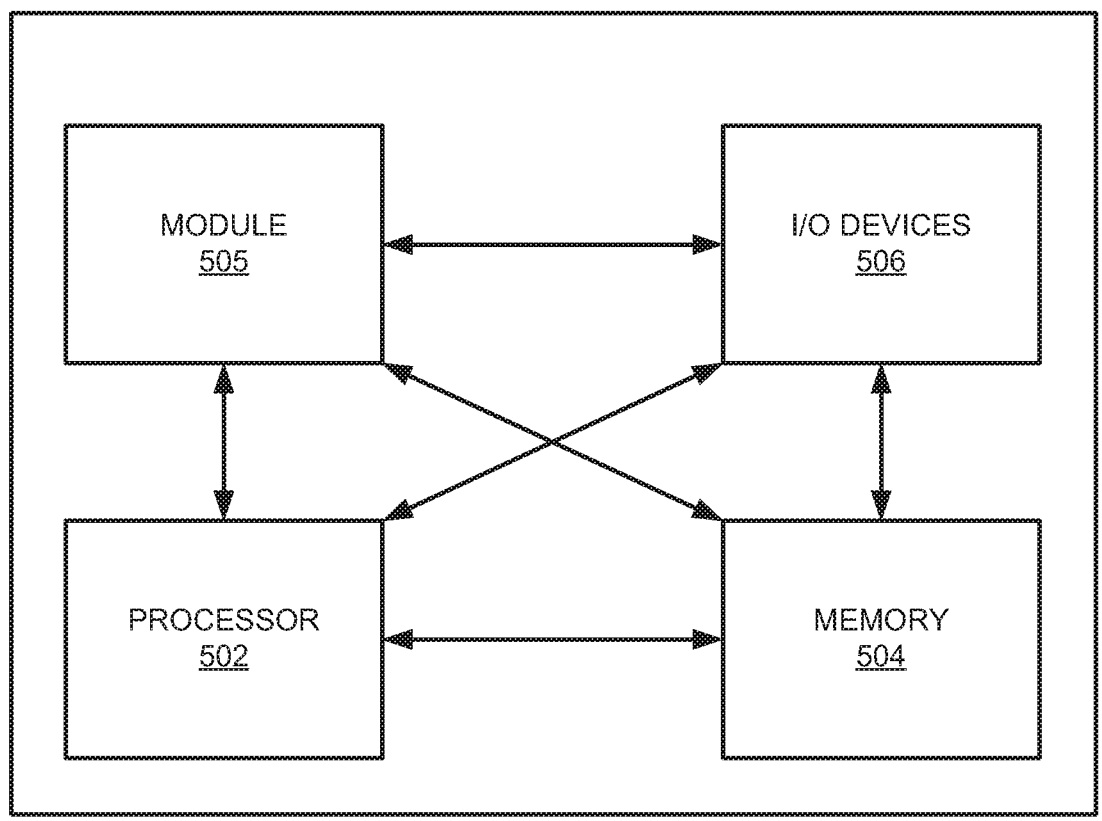
FIG. 5 illustrates a high level block diagram of a computing device specifically programmed to perform the steps, functions, blocks and/or operations described herein.

In accordance with the present disclosure, network 102 may include an application server (AS) 104, which may comprise a computing system or server, such as computing system 500 depicted in FIG. 5, and may be configured to provide one or more operations or functions in connection with examples of the present disclosure for harmonizing data across multiple sources. The network 102 may also include a database (DB) 106 that is communicatively coupled to the AS 104.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 5 and discussed below) or multiple computing devices collectively configured to perform various steps, functions, and/or operations in accordance with the present disclosure. Thus, although only a single application server (AS) 104 and single database (DB) are illustrated, it should be noted that any number of servers and databases may be deployed, and which may operate in a distributed and/or coordinated manner as a processing system to perform operations in connection with the present disclosure.

In one example, AS 104 may comprise a plurality of applications or data processing modules that perform various operations on data stored in multiple different data sources. For instance, the AS 104 may host an application that collects data items from the multiple different data sources (e.g., databases that may be connected, for example, to the access networks 120 and 122). The multiple data sources may be, for instance, databases of consumer data that are maintained by various consumer service providers. The application may perform various processing techniques on the data to normalize the attributes of the data items, since the multiple different data sources may store the respective attributes in different formats. The application may also analyze the normalized attributes and group the data items into groupings according to observed attribute similarities. For instance, the application may merge or consolidate information from data items associated with the same consumer who is subscribed to the services of two or more consumer service providers in order to create a single profile for the consumer. Once the data items have been grouped in this way, the application may analyze the single profile that results and may make recommendations based on the information in the single profile. The recommendations may include, for instance, changes to one or more services to which a consumer is subscribed.

In one example, the DB 106 may store the single profiles that are created as a result of the grouping of the data items. For instance, where the multiple data sources store consumer data, and the application hosted on the AS 104 groups the consumer data so that a single profile for a consumer can be created, and the DB 106 may store the profiles for multiple consumers. Each profile may include, for example, a consumer's name and/or aliases, the consumer's birthdate, the consumer's present (and optionally previous) physical address(es), the consumer's email address(es), the consumer's present (and optionally previous) landline and/or mobile phone numbers, the services to which the consumer is presently subscribed, the levels or tiers of service to which the consumer is presently subscribed, and/or other information. In this way, the DB 106 may serve as a single source of truth (SSOT) or "master" data source for the consumer data. The DB may store the profiles in encrypted form to protect the privacy of the consumers associated with the profiles.

In one example, the DB 106 may also store a history of any recommendations that have been made to a consumer based on the created profiles. The history may include, for example, the details of the recommendation that was made, when the recommendation was made, whether the consumer followed the recommendation, when the consumer followed the recommendation, and/or any changes that may have been made to the recommendation (e.g., based on feedback from the consumer).

For ease of illustration, various additional elements of network 102 are omitted from FIG. 1.

Figure 2:
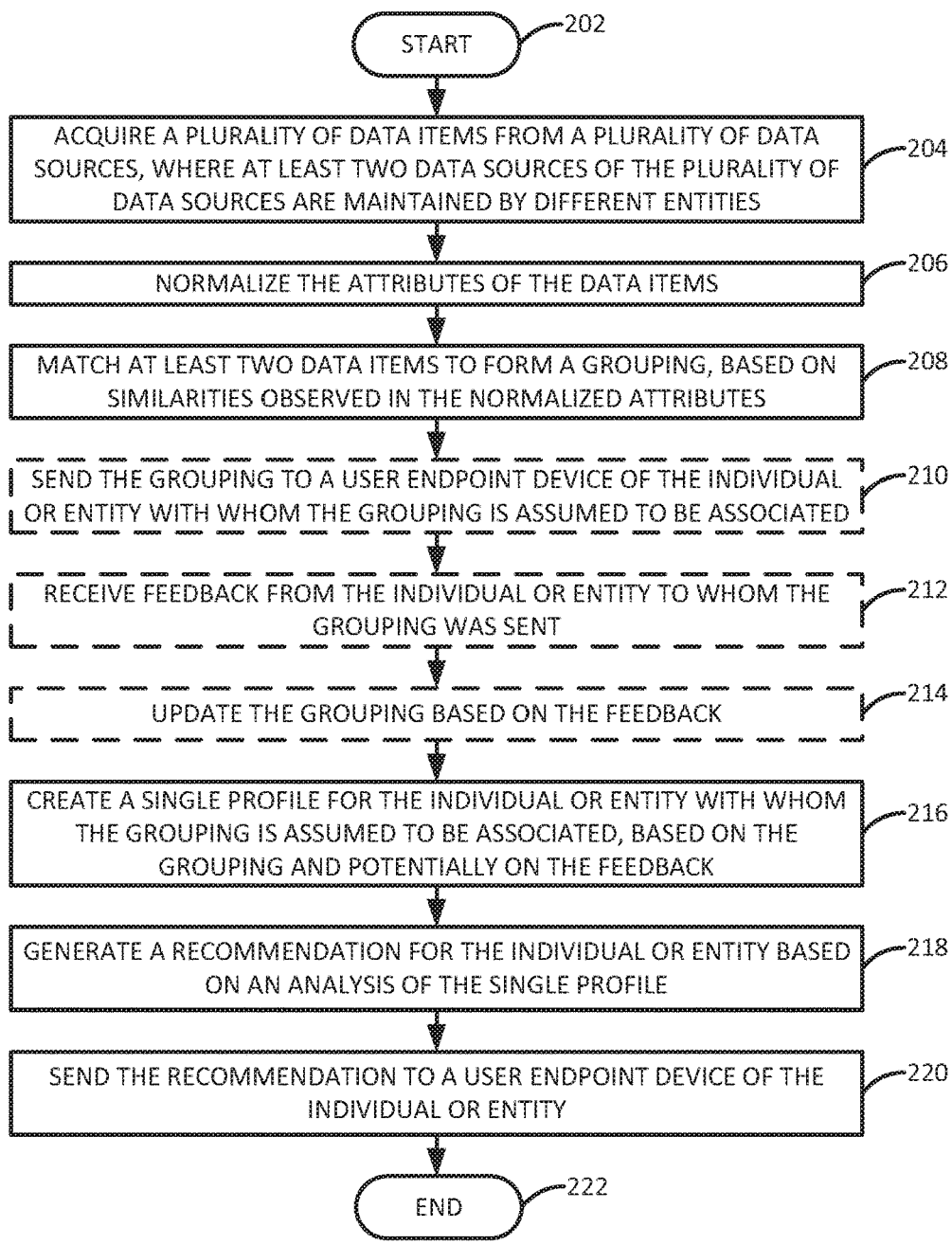
FIG. 2 illustrates a flowchart of an example method for harmonizing data across multiple sources, in accordance with the present disclosure.

In one example, access network 122 may include an edge server 108, which may comprise a computing system or server, such as computing system 500 depicted in FIG. 5, and may be configured to provide one or more operations or functions for harmonizing data across multiple sources. For instance, an example method 200 for harmonizing data across multiple sources is illustrated in FIG. 2 and described in greater detail below.

In one example, application server 104 may comprise a network function virtualization infrastructure (NFVI), e.g., one or more devices or servers that are available as host devices to host virtual machines (VMs), containers, or the like comprising virtual network functions (VNFs). In other words, at least a portion of the network 102 may incorporate software-defined network (SDN) components. Similarly, in one example, access networks 120 and 122 may comprise "edge clouds," which may include a plurality of nodes/host devices, e.g., computing resources comprising processors, e.g., central processing units (CPUs), graphics processing units (GPUs), programmable logic devices (PLDs), such as field programmable gate arrays (FPGAs), or the like, memory, storage, and so forth. In an example where the access network 122 comprises radio access networks, the nodes and other components of the access network 122 may be referred to as a mobile edge infrastructure. As just one example, edge server 108 may be instantiated on one or more servers hosting virtualization platforms for managing one or more virtual machines (VMs), containers, microservices, or the like. In other words, in one example, edge server 108 may comprise a VM, a container, or the like.

In one example, the access network 120 may be in communication with a server 110 and one or more DBs $116_1$-$116_m$ (hereinafter individually referred to as a "DB 116" or collectively referred to as "DBs 116"). Similarly, access network 122 may be in communication with one or more devices or data sources, e.g., DBs $112_1$-$112_n$ (hereinafter individually referred to as a "DB 112" or collectively referred to as "DBs 112"). Access networks 120 and 122 may transmit and receive communications between server 110, DBs 112 and 116, application server (AS) 104, other components of network 102, devices reachable via the Internet in general, and so forth.

In one example, the DBs 112 and 116 may be maintained by various consumer service providers (telecommunications service providers, financial service providers, media service providers, ecommerce service providers, social media platforms, gyms or fitness and health service providers, meal subscription services, and the like). For instance, a consumer service provider may maintain a database that stores profiles for the consumer service provider's customers. The profiles may include, for example, the customers' names, present or last known addresses, present or last known email addresses, present or last known landline and/or mobile phone numbers, services subscribed to (including level or tier of service), lengths of time or start dates of subscription, service usage (e.g., minutes used over a period of time, amount of data used over a period of time, frequency of usage, etc.), device(s) used to access the consumer service provider's services, payment histories and information, and/or other data. Similarly, a social media platform may maintain a database that stores profiles for the social media platforms subscribers. These profiles may include, for example, the subscribers' names (or nicknames), locations, birthdates, email addresses, sign-in and posting histories, memberships in social media groups (e.g., college alumni groups, professional groups, sports fan groups, etc.). The DBs 112 and 116 may store the profiles in encrypted form in order to protect customer/subscriber privacy.

In one example, the access network 120 may also be in communication with one or more devices, e.g., user endpoint devices (UEs) $118_1$-$118_p$ (hereinafter individually referred to as a "UE 118" or collectively referred to as "UEs 118"). Similarly, access network 122 may be in communication with one or more devices, e.g., UEs $114_1$-$114_o$ (hereinafter individually referred to as a "UE 114" or collectively referred to as "UEs 114"). Access networks 120 and 122 may transmit and receive communications between UEs 114 and 118, application server (AS) 104, other components of network 102, devices reachable via the Internet in general, and so forth. In one example, any of the UEs 114 and 118 may comprise a computing device, such as a desktop computer, a laptop computer, a tablet computer, a mobile device, a cellular smart phone, a wearable computing device (e.g., smart glasses, a head mounted display, a smart watch, a fitness tracker, or the like), a gaming console, a set top box, an Internet of Things (IoT) device, or the like. In one example, any of the UEs 114 and 118 may comprise a computing system or device, such as computing system 500 depicted in FIG. 5, and may be configured to provide one or more operations or functions in connection with examples of the present disclosure for harmonizing data across multiple sources. For instance, groupings of data items that are assumed to be associated with the same individual or entity may be sent to a UE 114 or 118 of that individual or entity for verification and/or correction.

In one example, server 110 may comprise a network-based server for harmonizing data across multiple sources. In this regard, server 110 may comprise the same or similar components as those of AS 104 and may provide the same or similar functions. Thus, any examples described herein with respect to AS 104 may similarly apply to server 110, and vice versa.

In one example, the access network 122 may comprise a cellular network (e.g., a 4G network and/or an LTE network, or a portion thereof, such as an evolved Uniform Terrestrial Radio Access Network (eUTRAN), an evolved packet core (EPC) network, etc., a 5G network, etc.). Thus, the communications between DBs 112 and edge server 108 may involve cellular communication via one or more base stations (e.g., eNodeBs, gNBs, or the like). However, in another example, the communications may alternatively or additional be via a non-cellular wireless communication modality, such as IEEE 802.11/Wi-Fi, or the like. For instance, access network 122 may comprise a wireless local area network (WLAN) containing at least one wireless access point (AP), e.g., a wireless router. Alternatively, or in addition, DBs 112 may communicate with access network 122, network 102, the Internet in general, etc., via a WLAN that interfaces with access network 122.

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. In addition, as described above, the functions of AS 104 may be similarly provided by server 110, or may be provided by AS 104 in conjunction with server 110. For instance, AS 104 and server 110 may be configured in a load balancing arrangement, or may be configured to provide for backups or redundancies with respect to each other, and so forth. Thus, these and other modifications are all contemplated within the scope of the present disclosure.

FIG. 2 illustrates a flowchart of an example method 200 for harmonizing data across multiple sources, in accordance with the present disclosure. In one example, the method 200 is performed by a component of the system 100 of FIG. 1, such as by the AS 104, and/or any one or more components thereof (e.g., a processor, or processors, performing operations stored in and loaded from a memory), or by the AS 104 in conjunction with one or more other devices, such as server 110, edge server 108, and so on. In one example, the steps, functions, or operations of method 200 may be performed by a computing device or system 500, and/or processor 502 as described in connection with FIG. 5 below. For instance, the computing device or system 500 may represent any one or more components of the system 100 of FIG. 1 that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 500 may collectively function as a processing system. For illustrative purposes, the method 200 is described in greater detail below in connection with an example performed by a processing system.

The method 200 begins in step 202 and may proceed to step 204. In step 204, the processing system may acquire a plurality of data items from a plurality of data sources, wherein at least two data sources of the plurality of data sources are maintained by different entities. For instance, the plurality of data sources may comprise a plurality of databases, where each database of the plurality of databases is associated with a different consumer service provider (e.g., a telecommunications service provider, a financial service provider, a media service provider, an ecommerce service provider, or the like). The consumer service provider may maintain the database as a means of tracking data for customers who subscribe to the consumer service provider's services. In another example, the plurality of data sources may comprise a plurality of databases, where each database of the plurality of databases is maintained by a different subsidiary or affiliate of the same parent enterprise (e.g., a business, a university, a hospital network, or the like).

In one example, each data item acquired in step 204 may comprise a plurality of attributes, where each of the attributes may in turn define some characteristic of an individual with whom the data item is associated. For instance, in one example, the data items acquired by the processing system may comprise customer profiles that are maintained in the databases of various consumer service providers. In this case, the attributes of the data items may include the customers' names, present or last known addresses, present or last known email addresses, present or last known landline and/or mobile phone numbers, services subscribed to (including level or tier of service), lengths of time or start dates of subscriptions, service usage (e.g., minutes used over a period of time, amount of data used over a period of time, frequency of usage, etc.), device(s) used to access the consumer service providers' services, payment histories and information, and/or other data.

In one example, the individual or entity who is associated with a data item may provide permission for the data item to be shared before the data item is acquired by the processing system in step 204. That is, an individual or entity may opt out of sharing their information with the processing system. In one example, permission may be given (or declined) at the data-item level. For instance, each individual data item may be associated with its own permission that controls whether or not (or how) the data item may be used by the processing system.

In step 206, the processing system may normalize the attributes of the data items, e.g., such that all of the attributes of the same type are formatted into a common form that facilitates matching. As discussed above, different databases may not store the same types of attributes in the same formats. For instance, one database may list dates, such as customer birthdates, service start dates, billing cycle dates, and the like, in mm/dd/yyyy form, while another database may list the dates in dd/mm/yyyy form. As such, matching two dates listed in two different profiles acquired from two different databases may not be a completely straightforward task.

In one example, the processing system may utilize techniques such as data cleansing (e.g., detecting and, when possible, correcting, corrupt data), grouping (e.g., classifying the data according to type, such as date, name, location, or the like), address level parsing (e.g., segmenting of physical addresses into components such as building number, street name, city, and the like), fuzzy matching (e.g., matching data that meets a threshold of less than one hundred percent), dynamic configurations, and/or other techniques in order to normalize the attributes. In one example, one or more of these techniques may be driven by artificial intelligence. For instance, grouping may be performed using supervised machine learning techniques. These machine learning techniques may be domain-specific (e.g., trained specifically to recognize and normalize data attributes that belong to a specific domain). In one example, multiple, different machine learning techniques may be used to normalize the attributes.

In step 208, the processing system may match at least two data items to form a grouping, based on similarities observed in the normalized attributes. The resultant grouping may be assumed to be associated with a single individual or entity. In one example, the processing system may use any one or more of a variety of techniques to assess similarity of attributes, including phonetic algorithms (e.g., algorithms that match data items based on phonetic similarities in attributes of the same type, such as customer names that are listed as "Allison," "Alison," and "Allyson"), text-based algorithms (e.g., algorithms that match data items based on textual similarities in attributes of the same type, such as customer names that are listed as "Robert Smith" and "Robert P. Smith"), name-matching algorithms (e.g., algorithms that match data items based on the same name appearing in attributes of the same type, such as the same customer name, same city name, same street name, or the like), and/or other types of algorithms.

Thus, attributes may be matched based on being exact matches (e.g., "Robert Smith"="Robert Smith"), based on matching within some threshold (e.g., x percent text similarity), and/or based on matching as subsets of a same larger set or as a subset and a larger set containing the subset (e.g., the city of Atlanta, Fulton County, the state of Georgia). In a further example still, data items may be matched based on an implied association between attributes of different types. For instance, a first data item may indicate an address for "Robert Smith" in Atlanta, Ga., while a second data item may indicate that "Bob Smith" graduated from Georgia Institute of Technology, which is located in Atlanta, when "Robert Smith" was twenty-two years old. Various machine learning techniques, including unsupervised machine learning techniques paired with word embedding models that learn from the data domain and similarity metrics (which may have dynamic threshold configurations), may be used to learn associations between different types of attributes. These machine learning techniques may be domain-specific (e.g., trained specifically to recognize and normalize data attributes that belong to a specific domain). In one example, multiple different machine learning techniques may be used to learn and detect attribute associations.

Thus, in one example, matching of at least two data items may result in a grouping that contains at least two customer profiles, where the assumption is that the at least two customer profiles are associated with the same customer. For instance, a grouping may contain both a cellular service provider's profile for "Robert Smith" who was born on Jan. 5, 1980 and lives in Atlanta, Ga. and an Internet service provider's profile for "Robert P. Smith" who was also born on Jan. 5, 1980 and lives in Atlanta, Ga. In this case, it may be assumed, based on the similarities of the names, birthdates, addresses, and/or other attributes of the profiles (e.g., mobile phone numbers, email addresses, etc.), that "Robert Smith" and "Robert P. Smith" are the same person.

In step optional 210 (illustrated in phantom), the processing system may send the grouping to a user endpoint device of the individual or entity with whom the grouping is assumed to be associated. For instance, continuing the example of "Robert Smith" above, at least one of the profiles contained in the grouping may include an email address for Robert Smith. Thus, the processing system may send an email to Robert Smith that includes the grouping and identifies all of the data items that are contained in the grouping. The email may include a request asking Robert Smith to verify that each data item in the grouping is, in fact, associated with him and not with another Robert Smith. The grouping may also be sent to the individual or entity via other means, such as text message or by the individual or entity signing into a Web portal.

FIG. 3, for instance, illustrates an example grouping 300 of data items that may be presented to an individual for verification in accordance with the method 200 of FIG. 2. As illustrated, the example grouping 300 contains a plurality of data items $302_1$-$302_q$ (hereinafter individually referred to as a "data item 302" or collectively referred to as "data items 302"). Each data item 302 may comprise a profile from a different service provider, such as a cellular service provider, and Internet service provider, a social media platform, a gym or fitness service provider, or the like. As discussed above, some of the attributes of the data items 302 may be exact matches (e.g., the email address is an exact match across the three data items 302 shown; the birthdates, addresses, and mobile phone numbers are exact matches across the data items $302_1$ and $302_2$). Other attributes may not be exact matches, but may match within some threshold or as subsets within a larger set (e.g., Atlanta, Ga., as listed in data items $302_1$ and $302_2$, is in Fulton County, as listed in data item $302_q$; the birthdate of Jan. 5, 1980, as listed in data items $302_1$ and $302_2$, falls within the year 1980, as listed in data item $302_q$. Still other attributes may imply some association with other attributes, despite not matching exactly (e.g., membership in social media groups for the Atlanta Falcons NFL team and Georgia Tech Alumni, as listed in data item $302_q$, indicate some association with the area of Atlanta, Ga., as listed in the data items $302_1$ and $302_2$).

In one example, each data item 302 that is presented in the grouping 300 may include a dialog $304_1$-$304_q$ (hereinafter individually referred to as a "dialog 304" or collectively referred to as "dialogs 304") or other mechanism by which the individual may indicate whether or not the data item 302 is associated with the individual. Thus, the individual may review the grouping, data item by data item, and refine the processing system's matching results. In one example, the individual may also be presented with an option to edit any data item 302 that is presented in the grouping 304 (e.g., if the data item 302 is associated with the individual, but includes attribute information that is outdated).

Referring back to FIG. 2, in optional step 212 (illustrated in phantom), the processing system may receive feedback from the individual or entity to whom the grouping was sent in step 210. As discussed above, the feedback may indicate which data items in the grouping are correctly associated with the individual or entity and which data items in the grouping are not associated with the individual or entity. The feedback may also include corrections that the individual or entity may have made to attribute information of any of the data items.

In optional step 214 (illustrated in phantom), the processing system may update the grouping based on the feedback received in step 212. For instance, if the individual to whom the grouping was presented indicated that one of the data items contained in the grouping is not associated with the individual, then the processing system may remove that data item from the grouping. Similarly, if the individual to whom the grouping was presented indicated that some of the attribute information in one of the data items was incorrect, then the processing system may delete that attribute information or replace that attribute information with corrections provided by the individual. In one example, any updates made in step 214 may also feed back into any machine learning techniques that were used to perform the matching in step 208. In this way, future attempts to match data items may be improved (e.g., fewer "false positives" or incorrectly matched data items may occur, and/or the processing system may be better able to detect related data items that do not include exact attribute matches).

In step 216, the processing system may create a single profile for the individual or entity with whom the grouping is assumed to be associated. The single profile may be created based on the grouping that was created in step 208, as well as on any updates that may have been made to the grouping in step 214 based on feedback. The single profile may thus consolidate the information that was contained in the grouping, e.g., removing information that may be redundant or outdated.

FIG. 4, for instance, illustrates an example profile 400 that may be created based on the grouping 300 of FIG. 3. As illustrated, the profile 400 may include the individual's legal name (e.g., "Robert Smith") as well as any aliases or variations by which the individual may go. The profile may include additional information, such as the individual's physical address, birthdate, email address(es), and schools attended. In other examples, the profile 400 may omit any of this information. In other examples still, the profile 400 may include other information not illustrated in FIG. 4, such as the individual's current occupation and/or place of employment, other individuals with whom the individual lives (e.g., family or roommates), employment and/or military service history, and other information.

In addition, as illustrated, the profile 400 may include services to which the individual is subscribed (e.g., telecommunications services, streaming media services, financial services, gym memberships or fitness/health services, meal delivery services, and the like). The profile may indicate the specific service providers who provide the services, as well as the specific plans to which the individual is subscribed (e.g., how many gigabytes of data the individual is allotted under the individual's cellular service plan, how many concurrently connected devices are allowed under the individual's streaming media service plan, etc.) and the individual's average levels of usage with respect to the specific plans (e.g., average monthly cellular data usage is x percent of monthly allotment, etc.).

The profile 400 may also include a recommendation history indicating recommendations that may have been made to the individual based on his profile, as discussed in further detail below. For instance, the profile may indicate the date on which a recommendation was made, a nature of the recommendation (e.g., a type of service or a service provider involved in the recommendation), and/or whether the individual accepted the recommendation.

Referring back to FIG. 2, in step 218, the processing system may generate a recommendation for the individual with whom the profile is associated, based on an analysis of the profile. In one example, the recommendation may be made in response to the individual asking for a recommendation (e.g., "How can I save money on my streaming media subscription?" or "Should I subscribe to a cellular service plan with a higher data limit?"). In another example, the recommendation may be made in response to an event (e.g., a particular service provider lowering or raising the price of a subscription, a new service provider becoming available in the individual's city, where the new service provider was previously unavailable in the individual's city, etc.). In another example, the processing system may periodically analyze profiles to detect when a recommendation may be made.

In one example, the recommendation may comprise a change in the individual's usage of consumer service providers that is expected to improve the individual's experience with one or more of the service providers. For instance, the processing system may detect that the individual uses a first service provider for cable television service and a different, second service provider Internet service. However, the individual may be able to save money by switching to a bundled service provided by a third service provider that provides cable television, Internet access, and landline phone service. Similarly, the individual may be unaware that he is eligible for a discount on his subscription to a streaming media service provider based on, for example, his military service history, his current place of employment, his age (e.g., a senior citizen discount), his educational status (e.g., student discount), his subscription with another service provider (e.g., customers of cable television service provider X are eligible for a year of free service with streaming media service provider Y, American Automobile Association members are eligible for a discount from cellular service provider Z, etc.), and/or the like. In another example, a recommendation made to a business entity may suggest that the business entity consolidate the number of vendors from which the business entity purchases information technology equipment (e.g., instead of purchasing ten routers from ten different vendors A-J, purchase five routers from vendor A and five routers from vendor B to receive bulk discounts).

In step 220, the processing system may send the recommendation to a user endpoint device of the individual for whom the recommendation was generated. For instance, the processing system may send an email or a text message to the individual's user endpoint device, where the text message or email includes the recommendation. The text message or recommendation may alternately provide a hyperlink or notification by which the individual may access a Web portal to review the recommendation.

The method 200 may end in step 222.

In some examples, the processing system may track whether the individual accepts recommendations that are made, and may update the individual's profile accordingly as discussed above. The processing system may also use information about the individual's history of accepting recommendations to guide the generation of future recommendations. For instance, the processing system may determine (e.g., using machine learning techniques), that the individual accepts less than twenty percent of the recommendations made. As such, the processing system may generate fewer recommendations for the individual. Alternatively the processing system may determine (e.g., using machine learning techniques) that the user is more likely to accept recommendations related to a specific type or class of services. As such, the processing system may generate more recommendations that are related to that specific type or class of services.

In further examples still, the recommendations sent to the individual may facilitate interaction of the user with the service provider associated with the recommendation. For instance, a recommendation sent by email or text message (or via Web portal) may include a hyperlink that initiates a phone call or a Web chat with a specific representative of the service provider.

Moreover, as feedback is received on groupings and recommendations, the method 200 may learn associations that help the method 200 to improve the quality of future groupings and recommendations, as noted above. This learning may also facilitate efficient processing of new data items as the new data items become available.

It should be noted that the method 200 may be expanded to include additional steps, or may be modified to replace steps with different steps, to combine steps, to omit steps, to perform steps in a different order, and so forth. For instance, in one example the processor may repeat one or more steps of the method 200, such as steps 208-214 based on user feedback, etc. In another example, the method 200 may include storing one or more digital objects, e.g., in a database or at the edge server. Thus, these and other modifications are all contemplated within the scope of the present disclosure.

In addition, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 5 depicts a high-level block diagram of a computing device or processing system specifically programmed to perform the functions described herein. For example, any one or more components or devices illustrated in FIG. 1, or described in connection with the method 200 of FIG. 2 may be implemented as the processing system 500. As depicted in FIG. 5, the processing system 500 comprises one or more hardware processor elements 502 (e.g., a microprocessor, a central processing unit (CPU) and the like), a memory 504, (e.g., random access memory (RAM), read only memory (ROM), a disk drive, an optical drive, a magnetic drive, and/or a Universal Serial Bus (USB) drive), a module 505 for harmonizing data across multiple sources, and various input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 502 can also be configured or programmed to cause other devices to perform one or more operations as discussed above. In other words, the hardware processor 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), a graphics processing unit (GPU), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 505 for harmonizing data across multiple sources (e.g., a software program comprising computer-executable instructions) can be loaded into memory 504 and executed by hardware processor element 502 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for harmonizing data across multiple sources (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method, comprising:
    acquiring, by a processing system including at least one processor, a plurality of customer profiles for customers of a plurality of consumer service providers, wherein at least one attribute of a first customer profile of the plurality of customer profiles is in a different format as compared to the at least one attribute of a second customer profile of the plurality of customer profiles;
    normalizing, by the processing system, the at least one attribute of the plurality of customer profiles into a common format, using a first machine learning technique;
    matching, by the processing system, at least two customer profiles of the plurality of customer profiles to form a grouping, wherein the matching is based on similarities observed in the at least one attribute of the at least two customer profiles subsequent to the normalizing, wherein the at least two customer profiles are believed to be associated with a same customer of the customers and wherein the at least two customer profiles are maintained by different consumer service providers of the plurality of consumer service providers; and
    creating, by the processing system, a single profile for the same customer, based on the grouping, wherein the single profile consolidates the at least one attribute of the at least two customer profiles.

2. The method of claim 1, wherein the plurality of consumer service providers comprises different affiliates of a parent enterprise.

3. The method of claim 1, wherein the at least one attribute defines characteristics of the customers associated with the plurality of customer profiles, including the same customer.

4. The method of claim 1, wherein the first machine learning technique comprises a supervised machine learning technique.

5. The method of claim 1, wherein the first machine learning technique is domain-specific.

6. The method of claim 1, wherein the matching is performed using a second machine learning technique.

7. The method of claim 6, wherein the second machine learning technique comprises an unsupervised machine learning technique paired with word embedding models.

8. The method of claim 6, wherein the second machine learning technique is domain-specific.

9. The method of claim 1, further comprising, subsequent to the matching but prior to the creating:
    sending, by the processing system, the grouping to an endpoint device of the same customer;
    receiving, by the processing system, feedback from the same customer; and
    updating, by the processing system, the grouping based on the feedback.

10. The method of claim 9, wherein the feedback comprises an indication that at least one of the at least two customer profiles is not associated with the same customer.

11. The method of claim 10, wherein the updating comprises removing the at least one of the at least two customer profiles from the grouping.

12. The method of claim 9, wherein the feedback comprises an edit to at least one attribute of at least one customer profile of the at least two customer profiles.

13. The method of claim 12, wherein the updating comprises deleting information associated with the at least one attribute from the grouping, based on the edit.

14. The method of claim 12, wherein the updating comprises replacing information in the grouping associated with the at least one attribute with a correction, based on the edit.

15. The method of claim 1, further comprising:
    generating, by the processing system, a recommendation for the same customer, wherein the recommendation is based on an analysis of the single profile; and
    sending, by the processing system, the recommendation to an endpoint device of the same customer.

16. The method of claim 15, wherein the recommendation comprises a recommended change to a service to which the same customer subscribes, wherein the recommended change is expected to improve an experience of the same customer with the service.

17. The method of claim 16, wherein the service is a telecommunications service.

18. The method of claim 16, wherein the service is a financial service.

19. A device comprising:
    a processor; and
    a computer-readable medium storing instructions which, when executed by the processor, cause the processor to perform operations, the operations comprising:
        acquiring a plurality of customer profiles for customers of a plurality of consumer service providers, wherein at least one attribute of a first customer profile of the plurality of customer profiles is in a different format as compared to the at least one attribute of a second customer profile of the plurality of customer profiles;
        normalizing the at least one attribute of the plurality of customer profiles into a common format, using a first machine learning technique;
        matching at least two customer profiles of the plurality of customer profiles to form a grouping, wherein the matching is based on similarities observed in the at least one attribute of the at least two customer profiles subsequent to the normalizing, wherein the at least two customer profiles are believed to be associated with a same customer of the customers and wherein the at least two customer profiles are maintained by different consumer service providers of the plurality of consumer service providers; and
        creating a single profile for the same customer, based on the grouping, wherein the single profile consolidates the at least one attribute of the at least two customer profiles.

20. A non-transitory computer-readable medium storing instructions which, when executed by a processing system including at least one processor, cause the processing system to perform operations, the operations comprising:
    acquiring a plurality of customer profiles for customers of a plurality of consumer service providers, wherein at least one attribute of a first customer profile of the plurality of customer profiles is in a different format as compared to the at least one attribute of a second customer profile of the plurality of customer profiles;

normalizing the at least one attribute of the plurality of customer profiles into a common format, using a first machine learning technique;

matching at least two customer profiles of the plurality of customer profiles to form a grouping, wherein the matching is based on similarities observed in the at least one attribute of the at least two customer profiles subsequent to the normalizing, wherein the at least two customer profiles are believed to be associated with a same customer of the customers and wherein the at least two customer profiles are maintained by different consumer service providers of the plurality of consumer service providers; and creating a single profile for the same customer, based on the grouping, wherein the single profile consolidates the at least one attribute of the at least two customer profiles.

* * * * *